United States Patent
Downs, Jr. et al.

[11] Patent Number: 6,104,816
[45] Date of Patent: Aug. 15, 2000

[54] HIGH NOISE COMMUNICATION SYSTEM

[75] Inventors: Edward F. Downs, Jr., Lynn Haven; Kevin M. Venturella, Panama City Beach, both of Fla.

[73] Assignee: The United States of America as represented by the Secretary of the Navy, Washington, D.C.

[21] Appl. No.: 09/144,683

[22] Filed: Aug. 31, 1998

[51] Int. Cl.⁷ .................................................. H04R 25/00
[52] U.S. Cl. ...................... 381/94.1; 381/375; 381/380; 381/190; 381/376
[58] Field of Search .................................. 381/94.1, 173, 381/326, 370, 372, 375, 380, 190, 328; 369/19; 455/79

[56] References Cited

U.S. PATENT DOCUMENTS

| | | | |
|---|---|---|---|
| 3,298,457 | 1/1967 | Warnaka | 181/290 |
| 3,881,569 | 5/1975 | Evans, Jr. | 181/33 K |
| 3,984,885 | 10/1976 | Yoshimura et al. | 381/309 |
| 3,985,198 | 10/1976 | Kurtze et al. | 181/33 G |
| 4,056,161 | 11/1977 | Allen, Jr. | 181/309 |
| 4,094,380 | 6/1978 | Kobayashi et al. | 181/285 |
| 4,150,262 | 4/1979 | Ono | 381/326 |
| 4,323,999 | 4/1982 | Yoshizawa | 369/19 |
| 4,392,244 | 7/1983 | Yoshizawa | 455/79 |
| 4,903,298 | 2/1990 | Cline | 455/89 |
| 4,922,542 | 5/1990 | Spiejewski | 381/373 |
| 4,966,799 | 10/1990 | Lucca et al. | 428/95 |
| 5,144,678 | 9/1992 | Lenz | 381/384 |
| 5,617,477 | 4/1997 | Boyden | 381/309 |
| 5,767,024 | 6/1998 | Anderson et al. | 442/378 |
| 5,817,408 | 10/1998 | Orimo et al. | 428/218 |

*Primary Examiner*—Forester W. Isen
*Assistant Examiner*—Clark S. Cheney
*Attorney, Agent, or Firm*—Harvey A. Gilbert; Donald G. Peck

[57] ABSTRACT

A head-supported two-way communication system. The system combines a thin substrate forehead or head-bone microphone, a noise filter embedding the microphone, a universal impedance matcher connecting the microphone to a two-way radio, an unobstructed and unfettered-access push-to-talk switch, and a pair of rigidly positionable noise protected speakers, all secured to a head-supported structure permitting proper location of the embedded microphone, the switch, and the speakers for a particular user and application.

20 Claims, 2 Drawing Sheets

HIGH NOISE COMMUNICATION SYSTEM

GOVERNMENT INTEREST STATEMENT

The invention described herein may be manufactured and used by the Government of the United States of America for Government purposes without the payment of any royalties thereon.

INTRODUCTION

The present invention relates to communications and communications systems. More particularly, the present invention relates to a head-supported communication system providing high clarity two way radio communications in high noise, high hazard, and environmentally extreme conditions.

BACKGROUND OF THE INVENTION

Two-way radio communications under the best of conditions can be difficult, or at a minimum, problematical. Such communications are often erratic, intermittent, and subject to various forms of environmental and operational interference and disruption. This is particularly true where the elements of the communications system being used are secured within the confines of or upon the structure of a helmet or other type of head gear or head-supported structure. Such helmet-type or head-supported systems are commonly used in military applications involving high-noise conditions in the air such as helicopters and other types of aircraft, on the surface, such as tanks, air-cushion vehicles, and personnel carriers, and on or beneath the surface of a body of water, such as high speed boats, air-cushion watercraft, and submersibles. The above applications, both civilian and military, are not, of course, all inclusive. Likewise, other civilian applications include, but are not limited to, helmets or other head-gear for motorcycle, skydiving, motor boating, jet ski, personal watercraft, firefighting, video game, police work, voice recognition for computers, and hazardous materials applications. There are both civilian and military applications where a gas mask must be worn with a helmet with eye and face protection, without interfering in any way with communications between the user and another.

The environmental exposure to which a helmet or head-supported communication system may be subjected include high and low temperature, extraordinary shock and vibration effects during handling and use, high levels of audible sound, moisture, and toxic and chemically damaging agents. One of the best examples of an environment containing the broadest spectrum of challenging and extreme environmental factors is that of firefighting. The firefighting application demands the use of special apparel such as gloves, helmet liners, and face and eye protective elements that may contribute adversely to the use and operational effectiveness of a helmet communication system.

In existing art helmet or head-supported communications systems, conventional microphones are typically positioned on a boom in front of the user's mouth to pick up speech. In this location, the microphone will pick up ambient background noise including wind noise, breathing, and other external noise transmitted into and through the helmet. Additionally, a boom microphone is obviously subject to physical damage during handling and use by virtue of its exposed and unprotected location. It may also constitute a hazard to the user by virtue of its position near the user's face. If the microphone is of a type mounted directly to the helmet or gas mask, sound and vibrations transmitted through the fabric or material structure will be picked up as interfering noise. Such noise may completely drown out or obscure otherwise intelligible voice communications. Noise cancellation provided by special circuitry may be applied to the microphone output to achieve some degree of improvement.

Speakers used as earphones in helmets or head-supported communications systems are either affixed to the helmet or head-supported structure or placed on the user's head and plugged into an accompanying radio. Typically, in prior art systems, the earphones are not adequately supported and adjustable to provide user comfort, maintainable position, and effective performance in an operationally challenging environment.

SUMMARY OF THE INVENTION

It is thus an object of the present invention to provide a head-supported, high-clarity, two-way voice communication system for use in an operationally challenging environment.

It is yet another object of the present invention to provide a head-supported, high-clarity, two-way voice communication system for use in a high noise environment.

It is further an object of the present invention to provide a head-supported, high-clarity, two-way voice communication system capable of picking up voice sounds out of a wind stream.

It is yet another object of the present invention to provide a head-supported, high-clarity, two-way voice communication system providing for voice pickup through a combination of flesh and bone.

It is still another object of the present invention to provide a head-supported, high-clarity, two-way voice communication system providing for voice pickup through the user's forehead, behind the ear, or on the back of the head.

It is yet an object of the present invention to provide a head-supported, high-clarity, two-way voice communication system providing mechanical and ambient noise filtering barrier.

It is another object of the present invention to provide a head-supported, high-clarity, two-way voice communication system providing for virtually hand-free operation.

It is still another object of the present invention to provide a head-supported, high-clarity, two-way voice communication system having no intrusive or potentially injurious functional elements.

It is still another object of the present invention to provide a head-supported, high-clarity, two-way voice communication system having easily positioned, and position maintainable ambient-noise-filtered speakers for ear input to the user.

It is finally an object of the present invention to provide a head-supported, high-clarity, two-way voice communication system having a virtually hands-free, and unobstructed access talk-to-listen switching capability.

In addressing all of the recited objects, the present invention, the high noise communication system, is a combination of ambient-sound-filtered voice output and voice input elements adjustably and functionally positioned in a head-supported structure. The head-supported structure of the present invention is a head-mounted means for positioning and maintaining a forehead or other skeletal contact microphone assembly in functional contact with the forehead or other skeletal contact locale of the user, an impedance matching device in proximity to the microphone assembly to permit maintenance of a reliable, impedance-matched connection between the microphone assembly and a user-selected two-way radio, the speakers in rigidly adjustable juxtaposition with the user's ears, and a two-way switching element, such as an activate-to-talk switch positioned to provide unobstructed, unfettered access to a user wearing gloves and other protective garments that could otherwise be expected to interfere with activate-to-talk switching. An alternative switching element may be a voice-command-operated two-way switch. The switching element connects between the radio and the microphone to permit the user to communicate. Voice inputs to the user are received from the two-way radio via ambient noise-filtered speakers. The speakers are flexi-rigidly and adjustably secured to the head-supported structure using a flexible rod so that they can be adjustably positioned and maintained in position for a particular user. Once positioned, they require little, if any, further adjustment and remain spatially located to be non-interfering and non-intrusive to the user's activities, including ingress and egress to the head-supported structure.

These and other features and advantages of the present invention will become apparent to those skilled in the art upon a reading of the following detailed description when taken in conjunction with the drawings wherein there is shown and described an illustrative embodiment of the invention.

DETAILED DESCRIPTION

Figure 1:
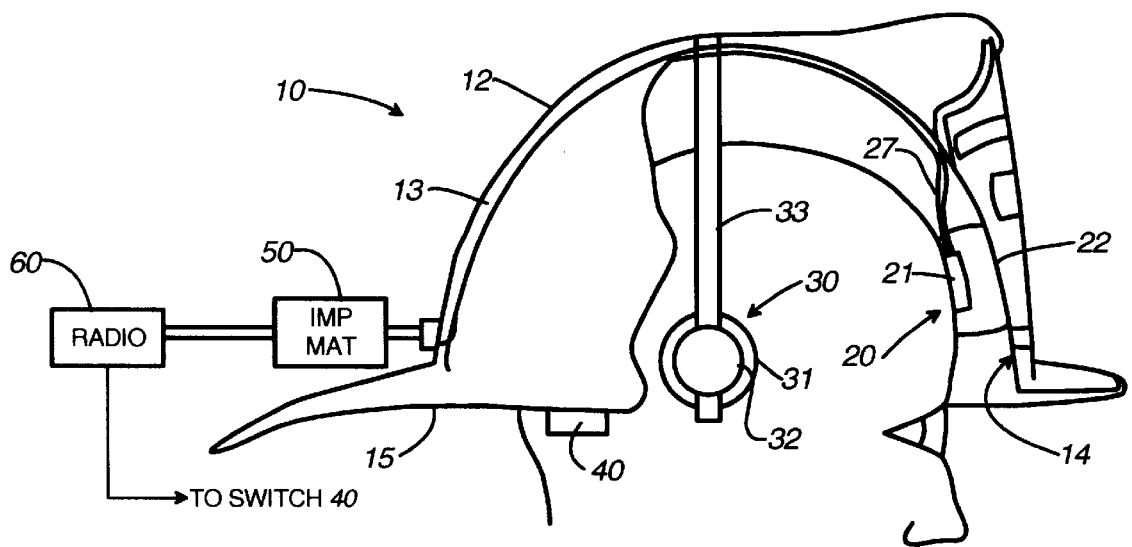
FIG. 1 is a partial side view of one embodiment of the present invention in use.

Referring to FIG. 1, it will be seen that the high noise communication system 10 comprises a head-supported structure such as the helmet 12, a microphone assembly 20, an earphone assembly 30, a activate-to-talk switch 40, and an impedance matching device 50. In FIG. 1, the head-supported structure is the helmet 12, in a configuration, for example, typically used in firefighting. Other means for supporting the communications components of the invention may be employed in different embodiments of the invention for different communications applications. For example, a rigid web-like structure similar to a helmet liner may be used.

Figure 2:
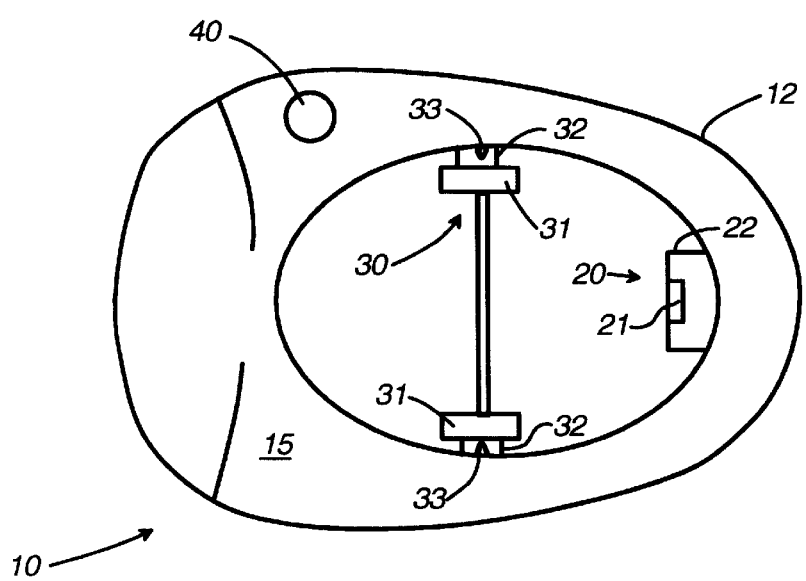
FIG. 2 is a bottom view up into a helmet employing the present invention.
Figure 3:
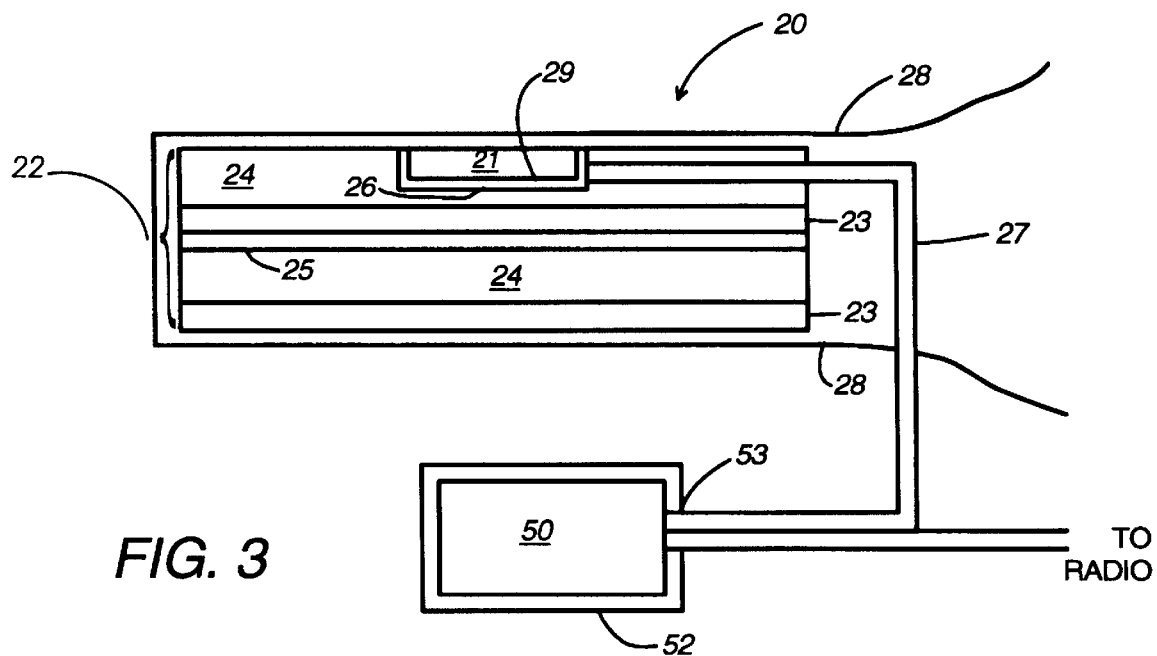
FIG. 3 is a partial side view of the microphone assembly of the present invention.

The microphone assembly 20 is secured as shown in FIGS. 1 and 2, to the forward portion 14 of the helmet 12 in a location placing it immediately adjacent to and in contact with the forehead of the helmet wearer. The microphone assembly 20 comprises the microphone 21 embedded in a multi-layered assembly comprising an acoustic filter 22. Microphone assembly 20 can optionally be encased in a protective fabric which is not illustrated in FIG. 1 but is depicted in FIG. 3 as a fabric pouch 28. The acoustic filter 22 consists of at least two layers of elastic material of different density. Thus, as depicted in a preferred embodiment in FIG. 3, a cross-sectional side view of two layers 23 of high-density rubber-like material are alternated with two layers 24 of low-density foam-like material. The layers 23 and 24 may be physically bonded together. In addition, FIG. 3 shows a lead sheet 25 sandwiched between a foam layer 24 and the next adjacent high-density rubber-like layer 23. A centrally located cavity 26 is created in the outermost low-density foam layer 24. The cavity 26 is sized and physically configured to receive and retain a thin sheet lead receptacle 29 which, in turn, snugly accommodates and retains the microphone 21. The entire microphone assembly is totally covered by the fabric pouch 28. Electrical connection of the microphone 21 external to the helmet 12 is accomplished by means of the microphone lead 27, as depicted in FIG. 1. The lead 27 extends from the microphone 21 through the microphone assembly 20 through and along the interior surface of the helmet 12, secured thereto, until exiting from a rear area of the helmet structure. External to the helmet 12, the microphone lead 27 connects to an impedance matching device 50, such as an impedance matching circuit, the output of which is connected to a radio 60. As shown in FIG. 3, the impedance matching device 50 is encased by the lead sheath 52 except for an opening permitting the entry of the signal from microphone 21 and the exit of the impedance matched signal output to the radio 60. Depending on the physical structure of the helmet 12, the electrical lead 27 may be buried or embedded within the helmet structure or in special molded channels 13 therein. These channels may be structurally reinforcing elements of the helmet structure or wiring accommodations. It is obviously important to route and secure the electrical lead 27 in the helmet 12 out of the way so that it does not interfere with user actions and is not cut, broken, or otherwise disconnected.

Figure 4:
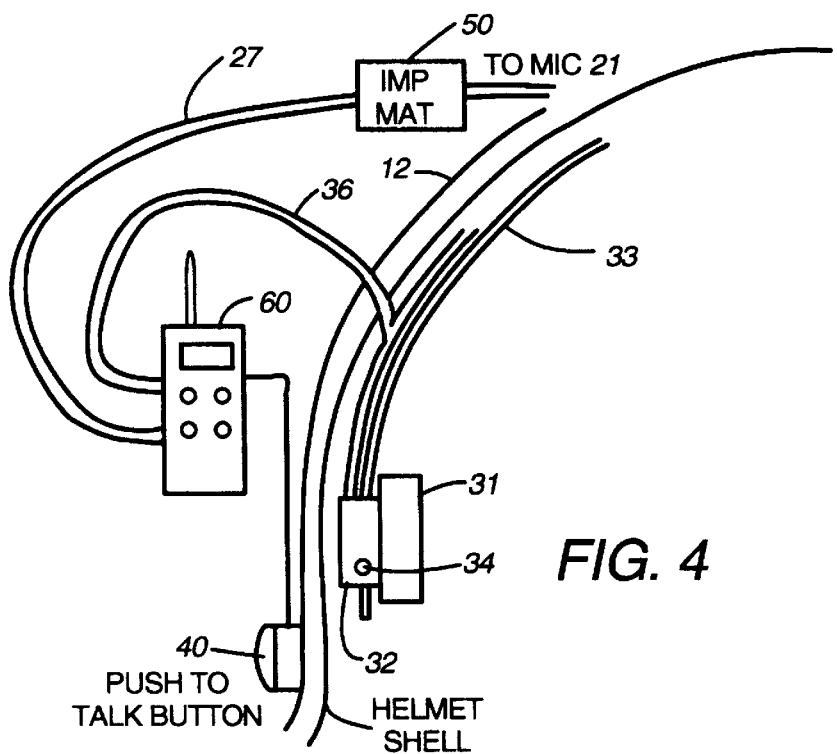
FIG. 4 is a partial frontal view of a helmet portion showing elements of the present invention.

This is true, of course, for any type of head support structure used. The earphone assembly 30 comprises speakers 31 affixed to mounting blocks 32 which are secured adjustably to flexible cable 33 by means of set screw 34. Each mounting block 32 has a hole extending centrally there through. One end of the flexible cable 33 extends slidably through the hole in each block 32 so that the earphone 31 attached to each block 32 can be vertically positioned on the cable relative to the wearer's ears. A threaded hole extends into the block 32 normal to the hole receiving the cable 33. The set screw 34 visible in FIG. 4 is used in the threaded hole to secure the cable 33 in the mounting block 32. Cable 33 is flexible enough to be formed to position the slidably attached earphones 31 adjacent to or in contact with the wearer's ears but rigid enough to retain its formed fit. Cable 33 is attached to the interior surface of the helmet 12 or other head-supported structure 11. In the embodiment shown in FIG. 1, the cable 33 is recessed in a channel 13 molded into the structure of the helmet 12 and affixed therein by adhesive or other bonding means. The earphones 31 connect to the radio 60 by means of the earphone lead 36.

The activate-to-talk switch 40 shown as a push-to-talk switch is affixed to the underside of the brim 15 of the helmet 12. The switch 40 is connected electrically to the two-way radio 60 which is secured to the wearer in a manner that assures its retention under all conditions of use. The configuration, size, and mechanism of the switch 40 and its location on the helmet 12 are such as to permit ease of use by a user wearing gloved or otherwise covered hands. For certain applications a voice-command switch can be used.

The impedance matching device 50 to which the microphone 21 is connected by electrical lead 27 permits impedance-matched connection of the microphone 21 to any HF, VHF, or SATCOM radio having an input impedance of 5 to 2000 ohms. The circuit 50 permits the microphone 21 to have the same output volume as the standard microphone designed for use with each radio used. The impedance matching device 50 is covered substantially with a thin metallic shield or sheath 52 to eliminate or minimize interference.

One embodiment of the helmet communication system 10 employees a microphone assembly 20 using a piezoelectric film microphone 21. The microphone 21 has a polyvinylidene membrane having a thickness of the order of 15 microns and is available from AMP SENSORS of Valley Forge, Pa.

The microphone 21 is embedded in one surface of the acoustic filter 22. The acoustic filter 22 in this embodiment is comprised of two layers of QUIET-MAT™ DSB-1 sound control material from Noise Reduction Enterprises, Marine Products Division, of Essex, Mass. This material is a composite of two layers. One layer is a 1 lb/Sq ft high-density barrier. This layer is laminated to a ¼ inch thick foam decoupler. Two layers of the composite material are bonded using glue sheets to a thin lead sheet 25 approximately ¹⁄₃₂ to ¹⁄₁₆ inches thick sandwiched between the two so that the high-density sound barrier side 23 of one composite layer is in contact with one side of the lead sheet 25 and the foam decoupler side 24 of the other composite layer is in contact with the other side of the lead sheet 25. The two composite layers completely cover the lead sheet 25. The entire sandwich is optimally sized at 2.5 inch by 8.0 inch for a typical application. It is important that the filter 22 be at least this size to maximize comfort for the wearer and to assure minimum ambient noise input to the microphone 21. The layer of high density material 23 comprising one side of the sandwich is the side embedding the microphone 21 and thus, facing the wearer's forehead. The entire microphone assembly 20 is contained protectively in the fabric pouch 28. The protective fabric pouch 28 is fabricated from DARLEX™ fabric #3608 from Shawmut Mills of West Bridgewater, Mass.

The impedance matching device 50 used between the microphone 21 and the radio 60 is a pre-set adjustable gain impedance matching circuit which will automatically match the output of the microphone 21 to any HF, VHF, or SATCOM radio with an input impedance value ranging from 5 ohms to 2,000 ohms. The circuit operates with a voltage supply of 5 to 35 volts DC. It allows the microphone 21 to have the same volume as the standard microphone designed to be used with each radio. The thin metallic sheath 52 encapsulating or covering the impedance matching circuit 50, with the exception of the opening 53, is approximately ¹⁄₃₂ to ¹⁄₁₆ inches thick. This covering in lead substantially reduces noise interference.

The flexible cable 33 used to position the earphones 31 in the helmet 12 in juxtaposition with the wearer's ears are black vinyl-covered flex arms from UNIPRISE International, Inc. of Terryville, Conn. The flex cable 33 used was 0.315 inches in diameter and about 3 feet in length. The actual length used is, of course, dependent on the helmet 12 size and placement of the flex cable 33 in the helmet 12.

Although the invention has been described relative to a specific embodiment thereof, there are numerous variations and modifications that will be readily apparent to those skilled in the art in light of the above teachings. it is, therefore, to be understood that, within the scope of the appended claims, the invention may be practiced other than as specifically described.

What is claimed as new and desired to be secured by Letters Patent of the United States is:

1. A high-noise environment communication system comprising:

a head-supported structure;

means for performing switching for two-way communications, said means adjustably securable to said head-supported structure;

a microphone;

an acoustic filter assembly substantially encasing said microphone wherein a portion of said microphone remains exposed, said acoustic filter assembly coupled to said head-supported structure so that said portion of said microphone is positioned adjacent an exterior portion of a user's head having near-surface bone structure when the head-supported structure is worn by said user;

said acoustic filter assembly being a solid structure having i) an open cavity lined with a high-density metal surrounding said microphone except for said portion remaining exposed, ii) a first layer of a low-density foam encasing said open cavity, iii) a second layer of a high-density rubber-like material adjacent said first layer, iv) a third layer of said high-density metal adjacent said second layer, v) a fourth layer of said low-density foam adjacent said third layer, and vi) a fifth layer of said high-density rubber-like material adjacent said fourth layer;

an impedance matching means securable to said head-supported structure and electrically connecting said microphone to a two-way radio and said two-way switching means; and means for supplying voice inputs to said user's ear, said means adjustably securable to said head-supported structure, rigidly adjustably mounted to permit positioning of said means in juxtaposition with said user's ear, and connected electrically to said two-way radio.

2. The system of claim 1 wherein said means for performing switching is a push-to-talk switch.

3. The system of claim 1 wherein said means for performing switching is a verbal-command-activated switch.

4. The system of claim 1 wherein said microphone in said acoustic filter assembly is forehead located by said head-supported structure.

5. The system of claim 1 wherein picking up voice sounds said microphone is a piezoelectric film microphone.

6. The system of claim 1 wherein said high-density metal is lead.

7. The system of claim 1 wherein said impedance matching means is a pre-set, adjustable-gain impedance matching circuit which will match the output of said microphone with any HF, VHF, or SATCOM radio having an input impedance value ranging from 5 ohms to 2000 ohms.

8. The system of claim 1 wherein said impedance matching means is substantially encased in a metallic noise shield.

9. The system of claim 1 wherein said means for supplying voice inputs to said user's ear is a piezo-ceramic speaker.

10. The system of claim 1 wherein said means for supplying voice inputs to said user's ear is adjustably affixed to a flexible cable secured to said head-supported structure and extending over the top of said user's head, said flexible cable permitting said means for supply voice inputs to be adjustably positioned in juxtaposition with said user's ear.

11. The system of claim 1 further comprising a protective fabric encasing said acoustic filter assembly along with said portion of said microphone.

12. A high-noise environment communication system, comprising:

a head-supported structure;

a microphone assembly adjustably secured to said head-supported structure to permit adjustable contact with a portion of the head of a user having a near-surface bone structure, said microphone assembly being a solid structure having i) a thin-film microphone substantially encased by a high-density metal wherein a surface of said thin-film microphone remains exposed, ii) a first layer of a low-density foam encasing said high-density metal wherein said surface of said thin-film microphone is flush with said low-density foam, iii) a second layer of a high-density rubber-like material backing the entirety of said first layer, iv) a third layer of said high-density metal backing the entirety of said second layer, v) a fourth layer of said low-density foam backing the entirety of said third layer, and vi) a fifth layer of said high-density rubber-like material backing the entirety of said fourth layer;

an impedance matching circuit connected to a two-way radio;

an activate-to-talk switch connected between said microphone assembly and said radio; and an earphone assembly rigidly-adjustably secured to said head-supported structure to permit positioning of said assembly in juxtaposition to said user's ear.

13. The system of claim 12 wherein said impedance matching circuit matches the output of said microphone assembly with any HF, VHF, or SATCOM radio having an input impedance value ranging from 5 ohms to 2000 ohms.

14. The system of claim 12 wherein said activate-to-talk switch is a push-to-talk switch sized to permit activation by a gloved user.

15. The system of claim 12 wherein said earphone assembly is adjustably affixed to a flexible cable secured to said head-supported structure and extending over said user's head, said flexible cable permitting said means for supplying voice inputs to be adjustably positioned in juxtaposition with said user's ear.

16. The system of claim 12 further comprising a protective fabric encasing said microphone assembly.

17. The system of claim 13 wherein said impedance matching circuit is protectively covered with a thin metallic noise shield.

18. A high-noise environment microphone assembly comprising:

an ambient noise filter being of a solid structure having i) a first layer of a low-density foam, ii) an open cavity lined with a high-density metal embedded in said first layer, iii) a second layer of a high-density rubber-like material adjacent said first layer, iv) a third layer of said high-density metal adjacent said second layer, v) a fourth layer of said low-density foam adjacent said third layer, and vi) a fifth layer of said high-density rubber-like material adjacent said fourth layer; and a piezoelectric transducer for picking up user voice sounds, said transducer fitted in said lined cavity such that a face of said transducer is exposed to permit user-voice sound pickup.

19. The microphone assembly of claim 18 wherein said transducer is a piezoelectric-film sound transducer connected as a microphone.

20. The of claim 18 wherein said high-density metal is lead.

* * * * *